(12) United States Patent
Chen et al.

(10) Patent No.: US 7,212,161 B2
(45) Date of Patent: May 1, 2007

(54) LOW-PROFILE EMBEDDED ANTENNA ARCHITECTURES FOR WIRELESS DEVICES

(75) Inventors: Zhi Ning Chen, Singapore (SG); Brian Paul Gaucher, Brookfield, CT (US); Thomas Richard Hildner, Cary, NC (US); Duixian Liu, Yorktown Heights, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 8 days.

(21) Appl. No.: 10/993,552

(22) Filed: Nov. 19, 2004

(65) Prior Publication Data

US 2006/0109184 A1    May 25, 2006

(51) Int. Cl.
*H01Q 1/24* (2006.01)
(52) U.S. Cl. ............... 343/700 MS; 343/702; 343/846
(58) Field of Classification Search ......... 343/700 MS, 343/702, 846
See application file for complete search history.

(56) References Cited

U.S. PATENT DOCUMENTS

| | | | |
|---|---|---|---|
| 6,661,380 B1* | 12/2003 | Bancroft et al. | 343/700 MS |
| 6,995,722 B2* | 2/2006 | Komatsu et al. | 343/711 |
| 2004/0056808 A1* | 3/2004 | Jenwatanavet | 343/702 |
| 2004/0104853 A1* | 6/2004 | Chen | 343/702 |
| 2004/0227674 A1* | 11/2004 | Asano et al. | 343/702 |
| 2005/0078038 A1* | 4/2005 | Takaki et al. | 343/702 |
| 2005/0248487 A1* | 11/2005 | Okado | 343/700 MS |

* cited by examiner

*Primary Examiner*—Trinh Vo Dinh
(74) *Attorney, Agent, or Firm*—F. Chau & Associates, LLC; Frank V. DeRosa

(57) ABSTRACT

Low-profile, compact embedded antenna designs are provided for use with computing devices, such as laptop computers, which enable ease of integration within computing devices with limited space, while providing suitable antenna characteristics (e.g., impedance matching and radiation efficiency) over a desired bandwidth of operation. Compact antenna designs with reduced antenna size (e.g., antenna height) and increased operational bandwidth (e.g., broadband impedance matching) are achieved using slotted ground plane designs and/or doubling antenna feeding schemes.

40 Claims, 15 Drawing Sheets y-z plane: horizontal plane
x-z plane: vertical plane

Average Gain in dBi

| Θ,° | 3.0 GHz | 3.5 GHz | 4.0 GHz | 4.5 GHz | 5.0 GHz | 5.5 GHz | 6.0 GHz | 6.5 GHz | 7.0 GHz | 7.5 GHz | 8.0 GHz | 8.5 GHz | 9.0 GHz | 9.5 GHz | 10.0 GHz | 10.5 GHz |
|---|---|---|---|---|---|---|---|---|---|---|---|---|---|---|---|---|
| -30 | -6.23 | -5.12 | -2.20 | -2.43 | -2.73 | -1.72 | -2.67 | -3.61 | -3.47 | -2.54 | -2.20 | -2.70 | -7.29 | -4.57 | -9.39 | -7.13 |
| -25 | -5.11 | -4.17 | -2.64 | -2.43 | -3.00 | -2.44 | -2.51 | -3.33 | -3.36 | -2.48 | -1.89 | -2.77 | -6.62 | -3.85 | -10.19 | -7.61 |
| -20 | -4.54 | -4.95 | -2.48 | -2.84 | -2.94 | -2.55 | -2.78 | -3.35 | -3.39 | -2.96 | -2.22 | -3.16 | -6.63 | -4.20 | -10.13 | -7.79 |
| -15 | -5.44 | -4.90 | -2.88 | -2.64 | -3.31 | -2.36 | -3.11 | -3.38 | -3.30 | -3.05 | -2.33 | -3.26 | -6.07 | -4.92 | -10.14 | -7.56 |
| -10 | -5.57 | -4.82 | -3.02 | -3.26 | -3.39 | -3.02 | -3.06 | -3.41 | -3.37 | -3.27 | -2.48 | -3.19 | -6.33 | -4.89 | -10.38 | -7.48 |
| -5 | -4.46 | -5.24 | -2.51 | -2.89 | -3.86 | -2.74 | -2.81 | -3.50 | -3.46 | -3.24 | -3.05 | -3.82 | -6.52 | -5.45 | -10.20 | -7.97 |
| 0 | -4.87 | -5.29 | -3.92 | -3.14 | -3.76 | -3.05 | -3.30 | -3.84 | -3.61 | -3.20 | -3.48 | -3.89 | -6.82 | -5.22 | -10.17 | -8.46 |
| 5 | -5.52 | -4.94 | -3.10 | -3.39 | -3.91 | -3.26 | -3.45 | -4.08 | -3.80 | -3.44 | -3.61 | -4.04 | -7.40 | -5.46 | -10.31 | -8.85 |
| 10 | -4.67 | -5.29 | -3.34 | -3.02 | -4.05 | -3.31 | -3.53 | -4.15 | -4.05 | -3.96 | -3.48 | -4.86 | -7.11 | -5.94 | -9.50 | -9.03 |
| 15 | -4.37 | -4.97 | -4.02 | -3.38 | -4.03 | -3.50 | -3.48 | -3.94 | -4.39 | -4.99 | -3.84 | -4.64 | -7.96 | -5.66 | -9.42 | -8.84 |
| 20 | -4.57 | -4.28 | -3.80 | -4.02 | -3.96 | -3.69 | -4.20 | -4.40 | -4.84 | -5.26 | -4.65 | -4.78 | -8.32 | -5.94 | -9.69 | -8.90 |
| 25 | -5.02 | -4.44 | -3.31 | -3.91 | -3.62 | -3.87 | -4.11 | -4.95 | -5.11 | -5.97 | -5.97 | -5.55 | -8.24 | -5.82 | -9.11 | -8.87 |
| 30 | -4.19 | -4.20 | -3.64 | -3.71 | -3.87 | -3.79 | -4.26 | -4.86 | -4.99 | -5.67 | -5.93 | -5.96 | -8.13 | -6.45 | -9.36 | -9.44 |

FIG. 14A

Peak Gain in dBi

| Θ,° | 3.0 GHz | 3.5 GHz | 4.0 GHz | 4.5 GHz | 5.0 GHz | 5.5 GHz | 6.0 GHz | 6.5 GHz | 7.0 GHz | 7.5 GHz | 8.0 GHz | 8.5 GHz | 9.0 GHz | 9.5 GHz | 10.0 GHz | 10.5 GHz |
|---|---|---|---|---|---|---|---|---|---|---|---|---|---|---|---|---|
| -30 | -3.10 | -2.26 | 1.77 | 2.83 | 0.95 | 3.31 | 3.42 | 1.94 | 1.44 | 1.98 | 1.87 | 2.56 | -3.43 | -0.97 | -3.34 | -2.53 |
| -25 | -0.87 | -0.17 | 1.48 | 2.18 | 1.85 | 2.51 | 3.35 | 3.11 | 2.12 | 1.38 | 3.22 | 2.38 | -2.27 | 0.18 | -3.82 | -3.36 |
| -20 | -1.83 | -1.35 | 1.26 | 2.26 | 1.29 | 2.84 | 3.39 | 2.82 | 2.49 | 2.20 | 2.65 | 2.91 | -2.07 | 0.22 | -4.21 | -1.85 |
| -15 | -1.61 | -2.41 | 1.69 | 2.88 | 1.60 | 3.57 | 3.19 | 3.08 | 2.55 | 2.35 | 2.53 | 2.78 | -1.42 | 0.32 | -3.59 | -1.77 |
| -10 | -1.71 | 0.40 | 1.41 | 1.70 | 1.91 | 2.68 | 3.77 | 3.15 | 2.71 | 0.68 | 2.95 | 2.11 | -1.00 | 0.01 | -4.08 | -1.04 |
| -5 | -0.75 | -1.15 | 2.58 | 2.38 | 0.60 | 3.90 | 3.45 | 2.88 | 1.95 | 1.21 | 2.55 | 1.72 | -1.35 | -0.19 | -4.72 | -1.98 |
| 0 | -1.51 | 0.89 | 1.70 | 2.31 | 2.05 | 3.27 | 3.78 | 3.18 | 2.68 | 1.71 | 2.22 | 1.91 | -1.31 | -0.30 | -4.65 | -2.18 |
| 5 | -2.15 | 1.59 | 2.45 | 2.12 | 0.74 | 3.74 | 3.40 | 2.35 | 2.62 | 2.25 | 2.62 | 2.19 | -2.32 | 0.25 | -4.72 | -3.80 |
| 10 | -0.36 | 0.05 | 3.03 | 2.98 | 1.79 | 2.93 | 3.64 | 2.41 | 2.77 | 1.84 | 3.74 | 0.55 | -2.11 | -0.79 | -2.67 | -2.67 |
| 15 | 1.83 | -0.12 | 2.74 | 2.78 | 1.65 | 3.51 | 3.50 | 2.06 | 2.04 | 0.95 | 2.91 | 1.38 | -2.73 | -0.20 | -3.55 | -1.63 |
| 20 | 1.28 | 3.19 | 2.58 | 2.59 | 1.96 | 2.97 | 3.41 | 1.95 | 2.22 | 0.88 | 2.23 | 0.68 | -3.10 | 0.52 | -4.01 | -2.44 |
| 25 | 0.92 | 2.21 | 3.36 | 1.66 | 2.68 | 2.74 | 3.19 | 2.19 | 1.75 | 0.78 | -0.60 | 0.39 | -1.22 | 0.10 | -2.75 | -3.03 |
| 30 | 0.98 | 1.45 | 3.13 | 3.26 | 2.13 | 2.67 | 3.33 | 2.26 | 2.54 | -0.36 | -1.20 | 0.84 | -2.48 | -0.05 | -3.65 | -4.07 |

FIG. 14B

LOW-PROFILE EMBEDDED ANTENNA ARCHITECTURES FOR WIRELESS DEVICES

TECHNICAL FIELD OF THE INVENTION

The present invention relates generally to embedded antenna designs for use with computing devices, such as laptop computers, to enable wireless connectivity and communication. More specifically, the invention relates to low-profile, compact embedded antenna designs that enable ease of integration within wireless devices with limited space, while providing suitable antenna characteristics and performance such as impedance matching and radiation efficiency over a wide bandwidth of operation.

BACKGROUND

Wireless connectivity and communication between devices in wireless networks/systems such as WPAN (wireless personal area network), WLAN (wireless local area network), WWAN (wireless wide area network), and cellular networks, for example, can be achieved by equipping wireless devices with antennas. For example, a WLAN may operate under the known "Bluetooth" standard to provide wireless network connectivity between devices such as a portable laptop computers, servers, printers, keyboards, modems, etc., wherein the devices include antennas to send and receive data via radio frequency (RF) communications.

In general, wireless devices can be designed having antennas that are disposed external to, or embedded within, the housing of such wireless devices. For example, some portable laptop computers are designed with external antennas located at the top of the display unit of such computers, or external antennas that are located on a PC card. However, there are disadvantages associated with external antenna designs including, for example, high manufacturing costs and susceptibility of antenna damage, as well as the adverse appearance of the device due to the external antenna. With other portable laptop computer designs, antennas are embedded within the display unit of such computers.

In general, embedded antenna designs for wireless devices provide advantages over external antenna designs including, for example, better appearance of such devices and less possibility of accidental breakage of the antenna. However, when antennas are embedded within the housing of computing devices with limited space and lossy environments, antenna performance can be adversely affected. For instance, antennas that are embedded in the display unit of a laptop computer can experience interference from surrounding metallic components such as a metal display cover, display panel frame, etc, or other lossy materials, but such interference can be avoided by locating/orientating the embedded antenna in the display unit away from such metal/lossy components. However, as computing devices are made smaller with increasingly limited space, embedded antennas must be designed with more compact structures and profiles, which is problematic. Indeed, for a given bandwidth of operation and antenna design, as an antenna is made smaller, the antenna performance decreases within the bandwidth.

SUMMARY OF THE INVENTION

Exemplary embodiments of the invention as described herein include embedded antenna designs for use with computing devices, such as laptop computers, to enable wireless connectivity and communication. More specifically, exemplary embodiments of the invention include low-profile, compact embedded antenna designs that enable ease of integration within computing devices with limited space, while providing suitable antenna characteristics (e.g., impedance matching and radiation efficiency) over a desired bandwidth of operation. In general, exemplary embodiments of the invention include methods for reducing antenna size (e.g., antenna height) and increasing operational bandwidth (e.g., broadband impedance matching) of compact antennas using slotted ground plane designs and/or doubling antenna feeding schemes.

For example, a low-profile antenna according to an exemplary embodiment of the invention includes a planar radiating element and a ground element that includes a planar ground element which is coplanar with the planar radiating element. The planar radiating element includes a first edge that is spaced apart and adjacent to a first edge of the planar ground element. The planar ground element includes a slotted region that is formed along a portion of the first edge of the planar ground element adjacent to the first edge of the planar radiating element.

The slotted region is patterned to minimize or eliminate the out-of-phase currents that are induced by the radiating element on the ground element adjacent to the radiating element, which enables the height of the planar radiator above the planar ground element to be significantly reduced for a given operating bandwidth while maintaining the radiation efficiency and impedance matching within the given operating bandwidth. In other words, currents induced on the ground plane close to the radiator are controlled for high radiation efficiency by slotting or notching the ground plane.

In accordance with exemplary embodiments of the invention, height-reduction methods and impedance matching techniques are used for designing low-profile INF (inverted-F) type and UWB (ultra-wide band) type antennas. For example, a low-profile inverted-F (INF) antenna with a slotted ground plane according to an exemplary embodiment of the invention for operation in the 2.45 GHz ISM band is provided, which enables the antenna height to be reduced to ½ of the height of a low-profile INF antenna with a non-slotted ground plane, while maintaining good antenna characteristics.

In addition, a low-profile UWB planar monopole antenna with a slotted ground plane according to an exemplary embodiment of the invention for operation in the wireless 3.1 GHz–10.6 GHz UWB band is provided, which enables the antenna height to be about 6 mm or less and thickness of 0.5 mm, which is significantly smaller than conventional UWB designs with non-slotted ground planes, while maintaining good antenna characteristics. In other exemplary embodiments of the invention, low-profile UWB antennas are designed with double feeding schemes to improve impedance matching over a wide operating bandwidth.

These and other exemplary embodiments, features and advantages of the present invention will be described or become apparent from the following detailed description of exemplary embodiments, which is to be read in connection with the accompanying drawings.

BRIEF DESCRIPTION OF THE DRAWINGS

FIGS. 14A and 14B are tables that illustrate average gain and peak gain measurements for the prototype low-profile antenna having the framework of FIGS. 7A~7B over a bandwidth of 3–10.5 GHz.

DETAILED DESCRIPTION OF EXEMPLARY EMBODIMENTS

In general, exemplary embodiments of the invention include compact embedded antenna designs for use with computing devices to enable wireless connectivity and communication. For illustrative purposes, exemplary embodiments of the invention will be described in detail hereafter with regard to low-profile embedded antenna designs and methods for embedding low-profile antennas within display units of portable laptop computers (e.g., IBM ThinkPad computer), but nothing herein shall be construed as limiting the scope of the invention.

Figure 1A:
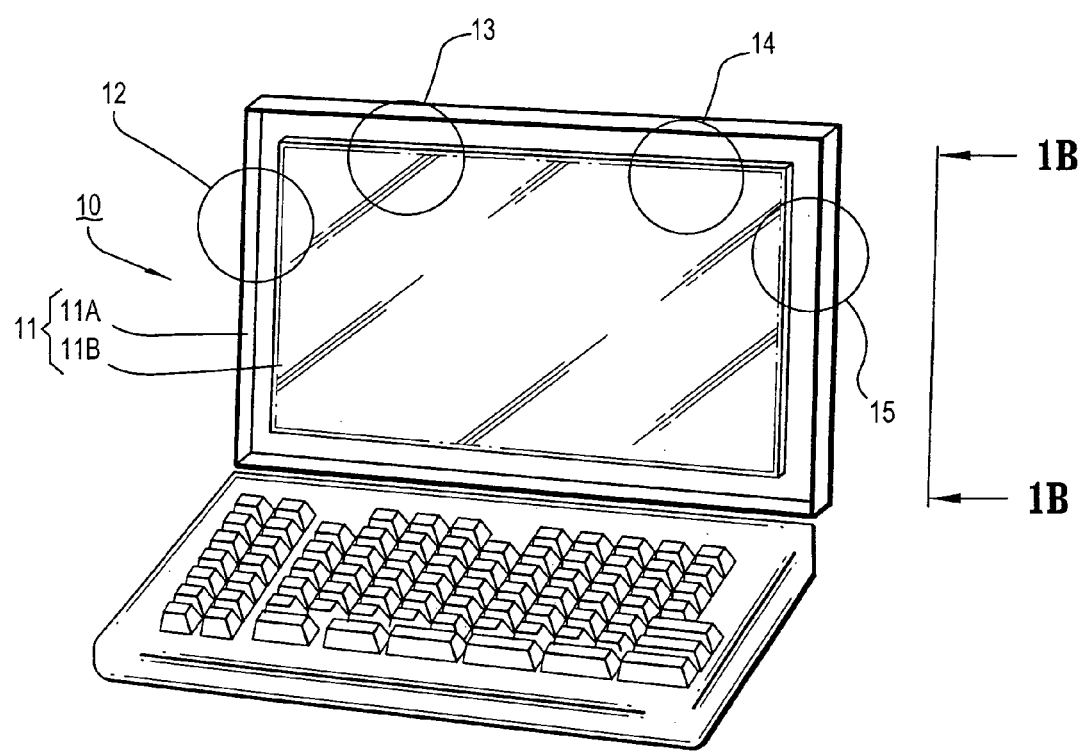
FIG. 1A is a schematic perspective view of a laptop computer having a display unit, which can be implemented with embedded antennas according to exemplary embodiments of the invention.
Figure 1B:
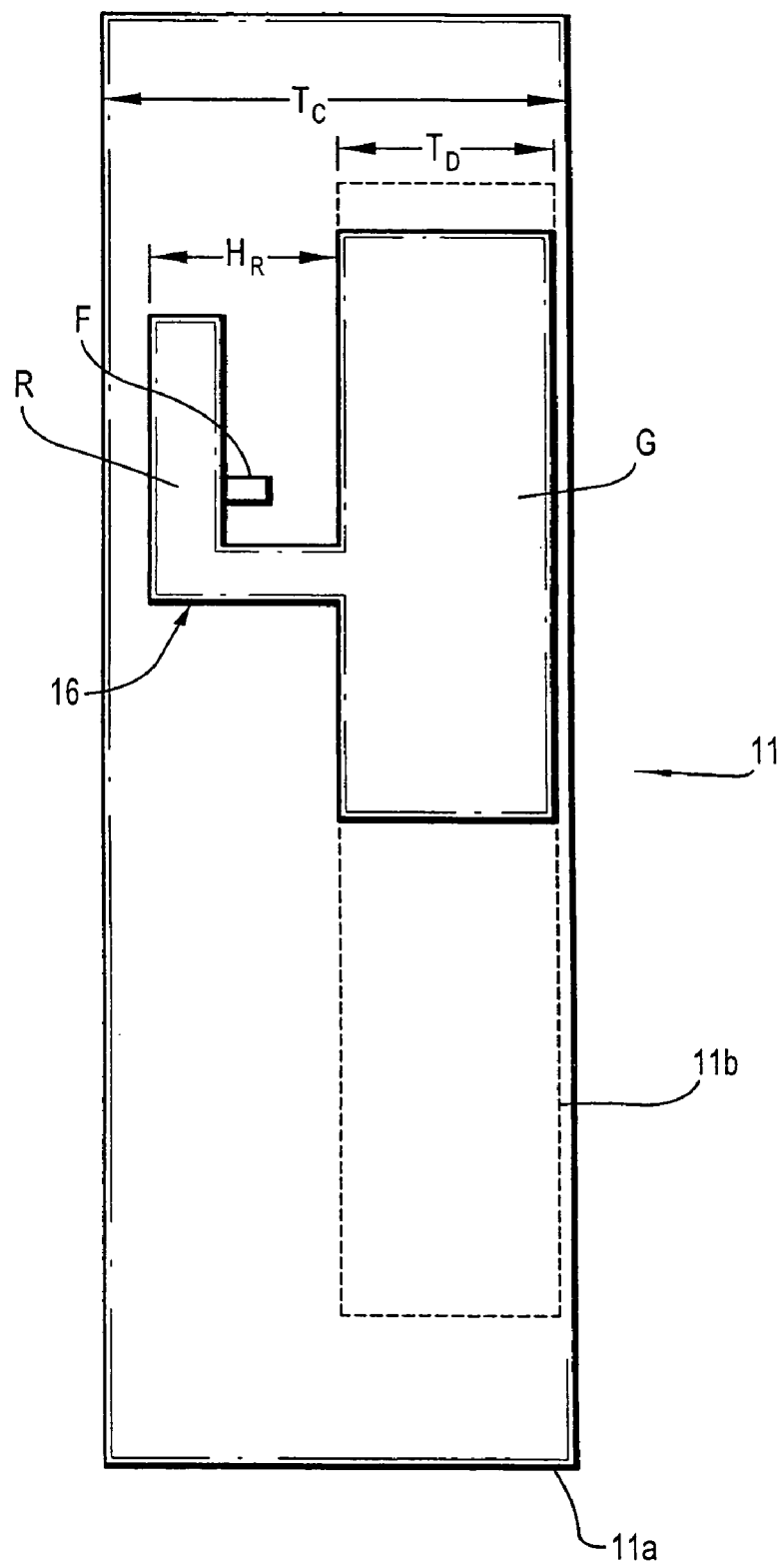
FIG. 1B is a schematic side view of the display unit of FIG. 1A illustrating location and orientation of an embedded antenna within the display unit according to an exemplary embodiment of the invention.

FIGS. 1A and 1B schematically illustrate methods for embedding antennas within the display unit of a portable laptop computer, according to exemplary embodiments of the invention. In particular, FIG. 1A is a schematic perspective view of a laptop computer (10) having a display unit (11). The display unit (11) comprises a display cover (11a), a display panel (11b), and metal hinge bars (not shown) that securely supports the display panel (11b) to the cover (11a). For instance, in an IBM ThinkPad laptop computer, a hinge bar is disposed on the left and right sides of the display panel and the lower end of such bars are fixed in the base unit. The display cover (11a) may be formed of a metal, composite or plastic material. Depending on the laptop design, a shielding plate may be disposed on the back of the display panel (11b) for purposes of electromagnetic shielding. In accordance with exemplary embodiments of the invention, low-profile embedded antennas can be disposed within the display unit (11) in one or more of various general locations (12), (13), (14) and/or (15) in the space/gap between the display cover (11a) and display panel (11b), as will be described in detail below. Embedded antennas can be placed on the left and right edge locations (12) and (15) of the display (11), to reduce the blockage caused by the display in some directions and provide space diversity to the wireless communication system, or one antenna can be disposed on a side edge location (12) or (15) and a second antenna disposed on an upper edge location (13) or (14) of the display unit (11) to provide antenna polarization diversity (depending on the antenna design used).

FIG. 1B schematically illustrates a method for embedding an antenna within the display unit of a laptop computer according to an exemplary embodiment of the invention. In particular, FIG. 1B is a schematic side-view along line 1B—1B of the display unit (11) as depicted in FIG. 1A, wherein the display cover (11a) is depicted as having a sidewall thickness, $T_C$, and the display panel (11b) is depicted as having a sidewall thickness, $T_D$. The illustrative embodiment of FIG. 1B further depicts an embedded antenna (16) having a radiating element (R) and a ground element (G), wherein the radiating element (R) and ground element (G) are coplanar metallic strips (e.g., stamped elements). In the exemplary embodiment of FIG. 1A, the antenna (16) is low-profile grounded monopole antenna in the form of an inverted-F (INF) antenna having an INF radiating element (R) and feed tab (F), but the antenna can be any type of antenna that can be designed according to the teachings of the invention, for example. The antenna (16) may be mounted at any desired location/orientation between the display cover (11a) and display panel (11b) such that the plane of the antenna (16) is substantially orthogonal (or slightly angled) with respect to the plane of the panel (11b).

In accordance with exemplary embodiments of the invention, low-profile embedded antennas for integration within a display unit of a laptop computer are designed in consideration of the space constraints and lossy environment in the display unit, to thereby provide high-performance, compact antenna designs. Indeed, the proximity of an embedded antenna to lossy semiconducting/conducting materials such as the display panel, a metallic display cover, or metal display frame, for example, can severely lower the radiation efficiency of the antenna. In accordance with exemplary embodiments of the invention, one method for achieving acceptable antenna performance as depicted in FIG. 1B is to dispose the antenna (16) such that the radiator portion (R) is located above (or extends past) the front surface of the display panel (11b) at a height, $H_R$. With current laptop designs, the sidewall thickness, $T_C$, of the cover (11a) is about 12 mm or less and the thickness, $T_D$ of the display panel (11b) is about 5 mm. As such, the antenna radiator height, $H_R$, is limited as being less than about 7 mm or less.

As the display units of laptop computers are designed with thinner profiles and less space, embedded antennas must be reduced in size, e.g., reduced height, $H_R$. However, as an antenna design for a given bandwidth of operation is physically made smaller, the smaller size results in poor impedance matching and low radiation efficiency within a desired bandwidth. In principle, the radiation from the radiator (R) will be canceled out by the radiation from the induced out-of-phase currents on the ground plane (G). For example, with a low profile INF antenna as depicted in FIG. 1B, it is preferable to have the antenna height be about 0.04 times the operating wavelength. For instance, for operation at the 2.45 GHz ISM band, it is preferable for the antenna height, $H_R$, to be 5 mm=5/122=0.04 times the operating wavelength. A further reduction in the height of the antenna (16), for example from 5 mm to half, namely 2.5 mm or 0.02 times operating wavelength, results in too high input impedance of the antenna to match, and too low radiation efficiency to effectively radiate. The exemplary low profile INF antenna (16) structure depicted in FIG. 1B can be modified using methods described hereafter to enable reduction in the radiator height, $H_R$, while maintaining desired antenna performance.

Figure 2:
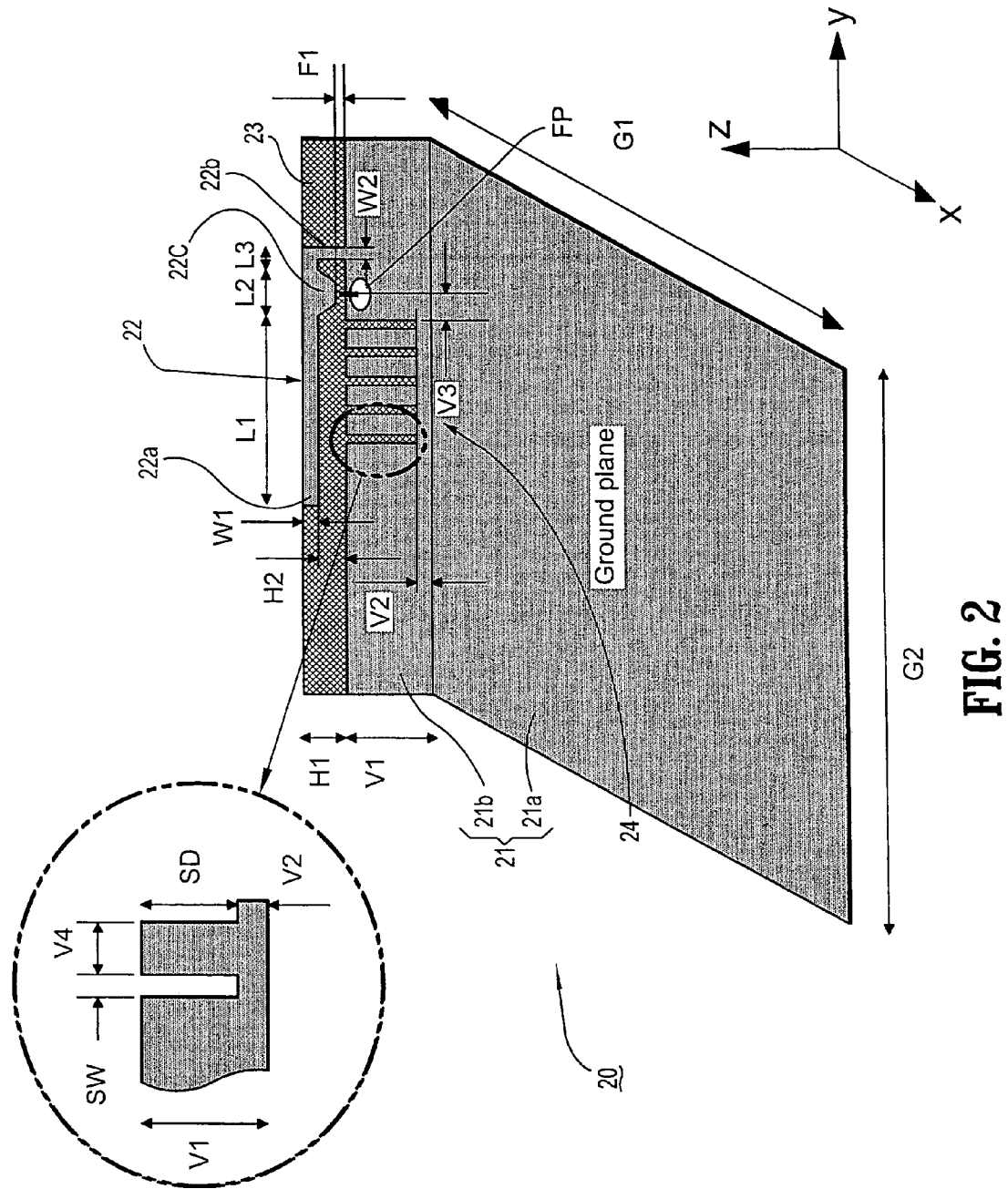
FIG. 2 is a schematic diagram illustrating a low-profile antenna according to an exemplary embodiment of the invention.

FIG. 2 is a perspective schematic view of a low-profile antenna according to an exemplary embodiment of the invention. More specifically, FIG. 2 schematically illustrates a low-profile inverted-F (INF) antenna (20) with a slotted ground plane according to an exemplary embodiment of the invention. In general, the antenna (20) comprises a ground element (21) (or ground) and a radiating element (22) (or radiator). The ground element (21) comprises a first (horizontal) ground element (21a) and a second 20 (vertical) ground element (21b). The ground element (21) is preferably formed using a high conductivity metal sheet. In the exemplary embodiment of FIG. 2, the radiator (22) comprises an inverted-F (INF) element that is printed, or otherwise formed, on one side of a substrate (23). The radiator (22) (INF element) comprises a horizontal arm (22a) portion, an end (vertical) portion (22b) and a feed tab (22c). The radiator (22) is connected to the second ground element (21b) via the vertical end portion (22b). The feed tab (22c) provides a connection point for an external feed line such as a coaxial cable, such as depicted and discussed below with reference to FIG. 3A.

As further depicted in the exemplary embodiment of FIG. 2, a plurality of narrow, open-ended slots (24) (or notches) are patterned in a portion of the second ground element (21b) that is adjacent the horizontal arm (22a) of the radiating element (22). As explained in detail below, the slots (24) provide a mechanism for modifying currents (or changing the current distribution) that are induced on the ground (21) near the radiator (22) to enable a significant reduction in the antenna height (H1) while maintaining high radiation efficiency and broad impedance bandwidth. In other words, depending on the radiation mechanism, the currents induced on the ground plane (21) can be controlled by slotting or notching the ground plane to optimize the antenna radiation efficiency and bandwidth.

The exemplary antenna (20) can be embedded within a display unit of a laptop computer, such as depicted in FIGS. 1A and 1B wherein the radiator (22) extends above a surface of the display panel. Because the display (11b) is very lossy, the vertical ground element (21b) preferably has the same height (V1) of the display (11b) so that the radiator (22) is disposed above the lossy display to achieve high radiation efficiency. However, the vertical ground element (21b) is not directly connected to a metal component such as the sidewall of a metallic cover or hinge bars of the display so as to prevent short-circuiting of the slots formed in the vertical ground element (21b). The first (horizontal) ground element (21a) can be directly connected to a metal component such as the support bars of the display panel (11b) or to the metal display cover (11a). Moreover, in another exemplary embodiment, the first (horizontal) ground element (21a) can be connected to the RF shielding foil on the back of the display panel (11b).

In one embodiment, the second ground element (21b) is printed/formed with the radiator (22) on the substrate (23) such that the vertical ground element (21b) and radiator (22) are coplanar. In other antenna embodiments, the radiating element(s) are non-coplanar with a notched/slotted portion of the ground element. However, impedance matching can be readily achieved when the vertical ground plane is close to the horizontal bottom of the radiator. In particular, the use of a vertical ground plane close to the bottom of the main radiator renders the impedance match more stable, i.e., less affected by the environment in which the antenna is installed. The edge of the vertical ground plane near the bottom edge of the radiator may be any shape.

Figure 4A:
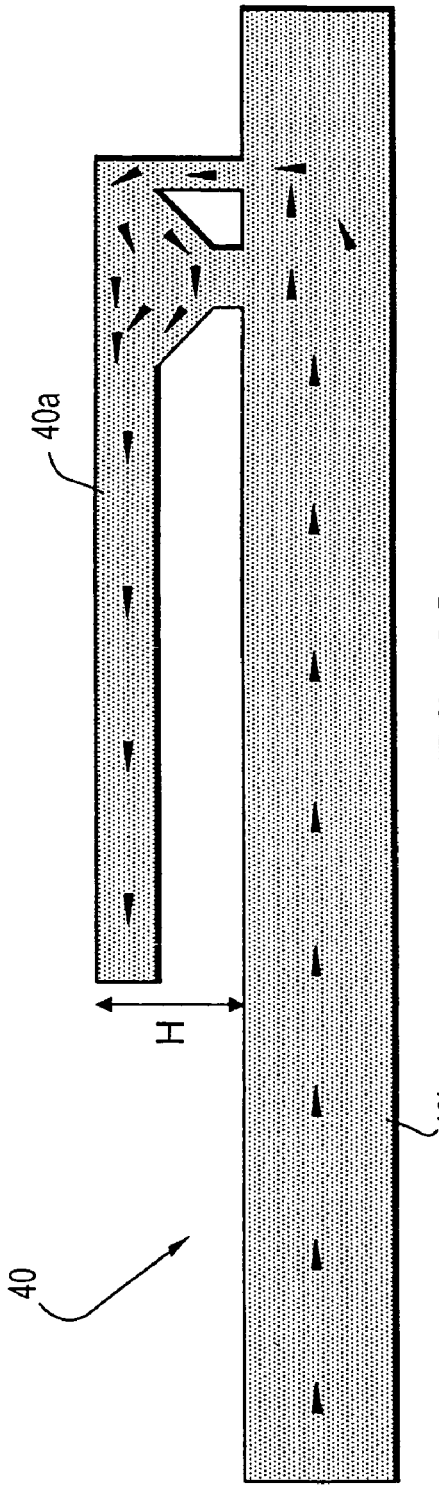
FIGS. 4A and 4B are schematic diagrams that respectively illustrate the current distribution of a low-profile INF antenna with non-slotted ground plane and a low-profile INF antenna with a slotted ground plane according to an embodiment of the invention, which are designed for operating at the same resonant frequency (operating at the same frequency band, 2.45 GHz ISM band).
Figure 4B:
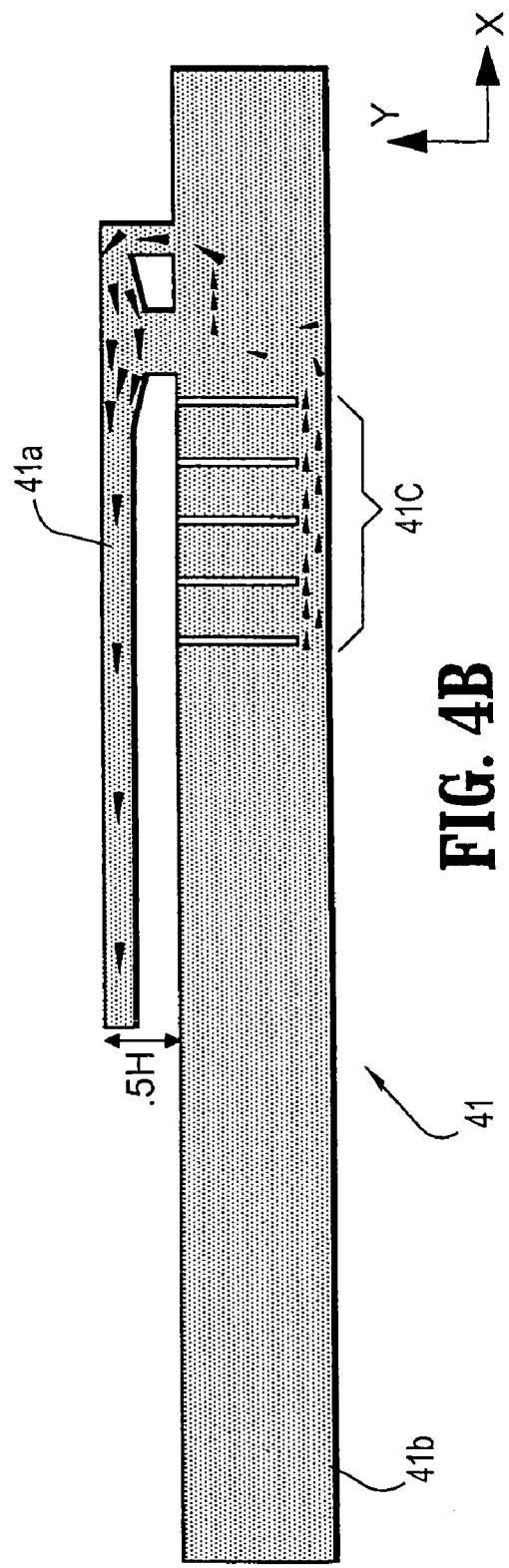
Figure 5A:
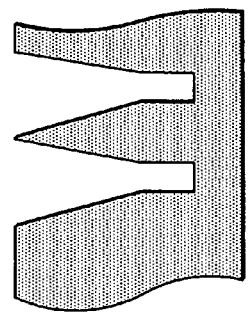
FIGS. 5A~5I illustrate various methods for forming slot patterns in ground planes to enable antenna height reduction, according to exemplary embodiments of the invention.
Figure 5B:
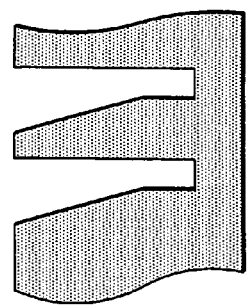
Figure 5C:
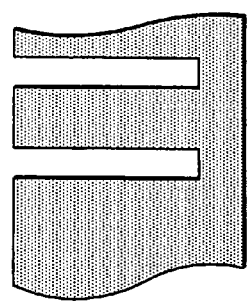
Figure 5D:
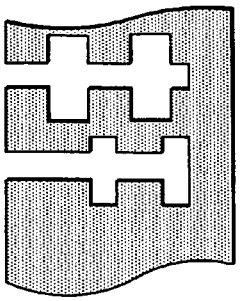
Figure 5E:
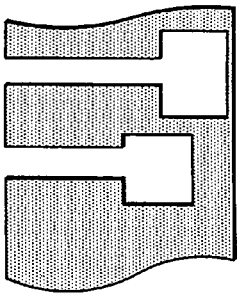
Figure 5F:
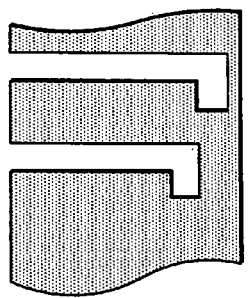
Figure 5G:
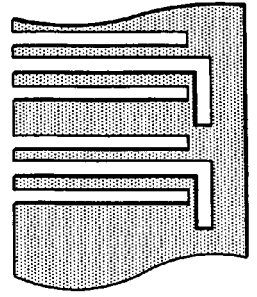
Figure 5H:
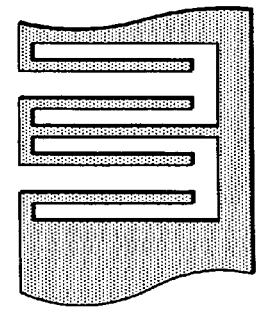
Figure 5I:
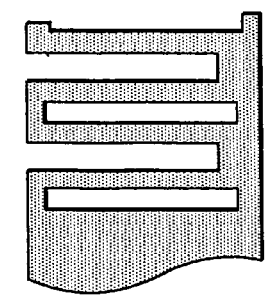

FIGS. 4A and 4B are schematic diagrams that respectively illustrate the current distribution of a conventional INF antenna with non-slotted ground plane and a low-profile INF antenna with a slotted ground plane according to an embodiment of the invention, which are designed for operating at the same resonant frequency (e.g., operating at the same frequency band, 2.45 GHz ISM band). More specifically, FIG. 4A depicts a low-profile INF antenna (40) with a non-slotted ground plane, wherein the horizontal arm (40a) of the radiating element is at height (H) above the ground plane (41b). As can be seen from FIG. 4A, the induced currents on the ground plane (40b), especially vertical section, are out of phase against the currents on the horizontal arm (40a) of the INF antenna (40). The radiation from the horizontal arm (40a) of the antenna (40) is partially cancelled out by the radiation from the out-of-phase currents on the vertical section of the ground plane (40b) due to the small distance of around 0.04 times operating wavelength. As the gap between the horizontal arm (40a) and vertical section (40b) is further decreased, the cancellation of out-of-phase currents will increase, resulting in lower radiation efficiency and poorer impedance match.

FIG. 4B depicts an INF antenna (41) with a slotted ground plane, wherein the horizontal arm (41a) of the radiating element is at height (0.5H) above the vertical ground element (41b). Due to the slots (41c) formed in the ground element (41b), the horizontal current components on the vertical ground element (41b), which are out-of-phase with the currents on the horizontal arm (41a) of the antenna (41), are concentrated further away from the horizontal arm (41a) (e.g., concentrated on the bottom of the vertical ground element (42b) close to the horizontal ground element), as compared to the current distribution of the embodiment in FIG. 4A. In other words, the out-of-phase currents on the horizontal arm (41a) and vertical ground element (41b) are separated due to the slots (41c), which results in increasing the radiation efficiency, lowering the resonant frequency, and improving impedance matching. Moreover, for the given frequency of operation, the height (0.5H) of the antenna (41) can be reduced to half of the height (H) of the antenna (40), while maintaining the same or similar antenna performance as achieved with the low-profile INF antenna (40) (FIG. 4A).

FIG. 2 depicts various dimensions of the antenna (20) that are considered for constructing/tuning the antenna (20) for a given operating bandwidth. The resonant frequency of the antenna (20) is determined primarily by the total length (L1+L2+L3+H2) of the INF element (22), which is about a quarter-wavelength long at the resonant frequency. The resonant frequency is also dependent on the slot depth (SD). The widths (W1) and (W2) of the metal strip portions forming the INF element (22) slightly affect the resonant frequency, but significantly affect impedance matching (e.g., increasing the widths (W1) and (W2) increases the bandwidth).

The impedance matching of the antenna (20) can be tuned by adjusting the length (L3) between the shorted-end of the horizontal radiating arm (22a) to the feed tab (22c). In particular, the impedance of the antenna (20) can be changed by moving the feed point (FP), wherein moving the FP to the left side (open-end) will increase the antenna impedance and moving the FP to the right (shorted-end) (i.e., to vertical element (22b)) will reduce the antenna impedance. The FP location will have some effect on the resonating frequency. The impedance of the antenna (20) also depends, to some extent, on the feed gap (F1) between the bottom edge of the feed tab (22c) and the top edge of the vertical ground element (21b). The feed gap (F1) has less affect on the impedance matching than the length (L3).

The distance (V1) corresponds to the dimensions of the display unit of the laptop computer in which the antenna (20) is installed, and is about the same as the thickness of the display panel. If necessary, the slots may be extended to horizontal ground element (e.g., when the distance (V1) is less than certain values such as 0.04 operating wavelength). The separation (V3) between the feedpoint (FP) and the first adjacent slot significantly affects impedance matching and the resonant frequency. The distance (V3) should be made small to suppress the horizontal components of the currents around the feed point. The slots located under the antenna arm have much better effect than those located on the right side of the feedpoint. The cancellation of radiation from the horizontal arm of antenna is mainly due to the horizontal components of the currents induced on this region (right under the longer arm of the antenna), where the horizontal components of the induced current are strong and out-of-phase. The horizontal radiation is mainly from the longer arm of the antenna. The smaller (V3) is, the lower the operating frequency.

The width (SW) of the slots is not critical as compared to the distance (V4). The distance (V4) should be narrow enough to suppress the horizontal components of the currents. In one exemplary embodiment, V4=2 mm and SW=0.2 mm. The depth of the open-end slot (SD) has significant effect on the performance of the antenna such as resonant frequency, impedance bandwidth, and radiation efficiency. The larger depth (SD) is conducive for low profile design because the horizontal components of currents on the vertical section of ground plane, which is out-of-phase against the radiating currents on the horizontal arm of the antenna, will be further from the radiating currents on the horizontal arm of the antenna.

The total distance between the horizontal arm of the antenna and bottom of slotted region (H2+SD) should be more than 0.04 times operating wavelength for effective radiation. The number of slots is dependent on the size of the horizontal arm of the antenna. The slots should cover most of the region right under the horizontal arm of the antenna. In the exemplary embodiment of FIG. 2, a further increase in the number of slots (e.g., greater than 5) has an insubstantial affect on the performance of the antenna. Slotting the vertical ground plane will lower the resonant frequency due to the increase in the current flow path.

The dimensions G1 and G2 of horizontal ground element (21a) are not critical in applications because the horizontal ground element (21a) will be electrically connected to system ground plane. In one exemplary embodiment, the minimum dimension is around half the operating wavelength to keep the design stable in a varying installation environment.

Figure 3A:
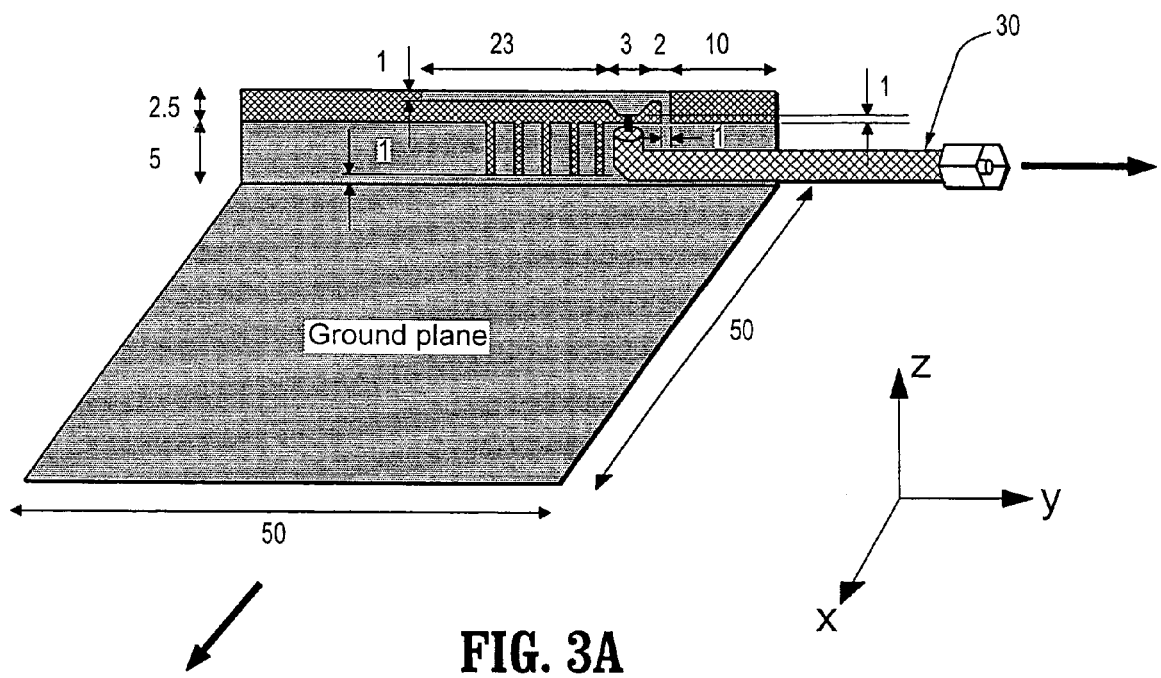
FIGS. 3A~3B schematically illustrate dimensions of a low-profile antenna having a framework similar to that of FIG. 2 for operation in the 2.45 GHz ISM band, according to an exemplary embodiment of the invention.
Figure 3B:
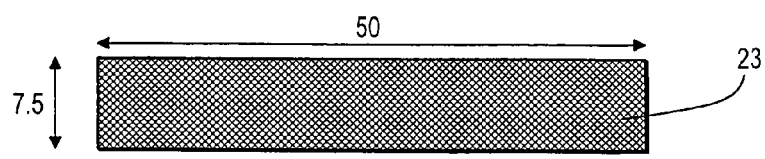

For purposes of testing and determining electrical properties and characteristics of a low-profile INF antenna design according to an embodiment of the invention, a prototype antenna was constructed using the antenna framework depicted in FIG. 2 for a laptop application, in particular, an IBM Thinkpad laptop with metal cover. FIGS. 3A~3B illustrate specific dimensions (in mm) for the exemplary prototype INF antenna having the antenna framework as depicted in FIG. 2 to provide a bandwidth of operation from about 2.40 GHz to 2.50 GHz (2.45 GHz ISM band). FIG. 3A is a schematic perspective view of the prototype antenna. The radiator (22) is fed by a coaxial cable (30), wherein an inner conductor of the coaxial cable is connected to the feedpoint (FP) and the outer shield is connected to the vertical and/or horizontal ground elements (although the orientation is not a concern). The radiator (22) and vertical ground element (21a) were formed on a thin dielectric slab PCB. In particular, the antenna was etched onto a 7.5 mm×50 mm×20 mil 25N Arlon PCB slab with a dielectric constant of 3.38 and a loss tangent of 0.0025 at 10 GHz. The ground element was electrically coupled to the metal cover and connected to the RF cable outer conductor. FIG. 3B depicts a back view of the substrate (23) having dimensions of 7.5 mm×50 mm. As depicted, the antenna pattern is formed on one side of the substrate (23) and the backside of the substrate (23) has no metal patterns formed thereon. The back-side of the substrate (23) contacts the sidewall of the metallic cover.

The prototype INF antenna of FIGS. 3A~3B was installed in an IBM ThinkPad laptop computer having a metal composite cover. A notch of dimension of 6 mm (high)×45 mm (long) was formed in the sidewall of the cover and the prototype antenna was mounted to the inner side wall of the cover such that the radiator was centrally located in the notch. The substrate (23) (y–z plane) was disposed substantially perpendicular to the plane of the display panel with the radiator portion extending past the plane of the display panel. The cover sidewall had a height of 11 mm (interior). An RF feed cable of a length of 12 cm is installed along the frame of the display. The minimum distance between the supporting hinge bar (between the display panel and antenna) and the antenna was about 1 mm. The thickness of the display panel was 5 mm. The top of the antenna was 3.5 mm lower than the top of the cover sidewall (which indicates that the prototype antenna can be used with thinner display units).

Figure 10:
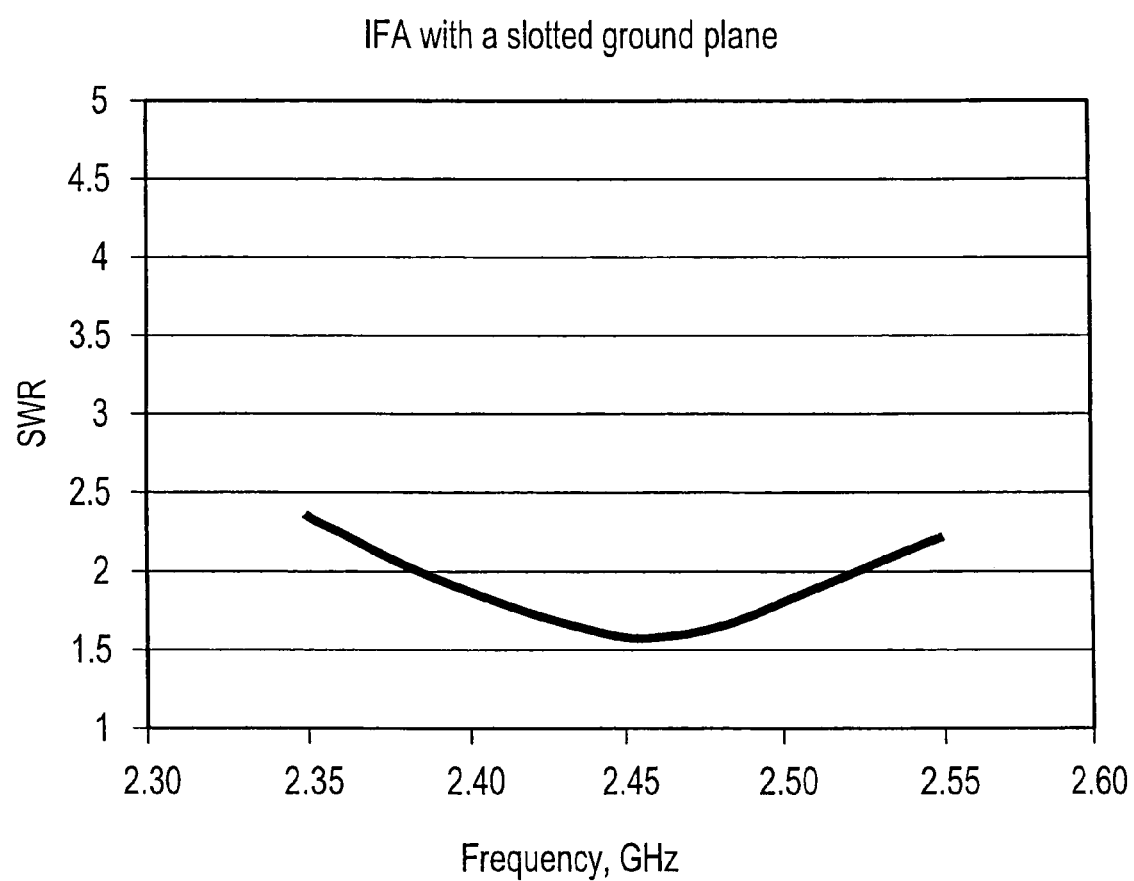
FIG. 10 graphically illustrates the measured SWR of a prototype low-profile antenna having the framework of FIGS. 3A~3B.

FIG. 10 illustrates the measured SWR (standing wave ratio) of the prototype INF antenna operating in the 2.45 GHz ISM band. As depicted in FIG. 1, The prototype INF antenna implemented in the laptop provides sufficient bandwidth (2:1 SWR) to cover the 2.45 GHz ISM band completely (2.4–2.5 GHz).

Figure 11:
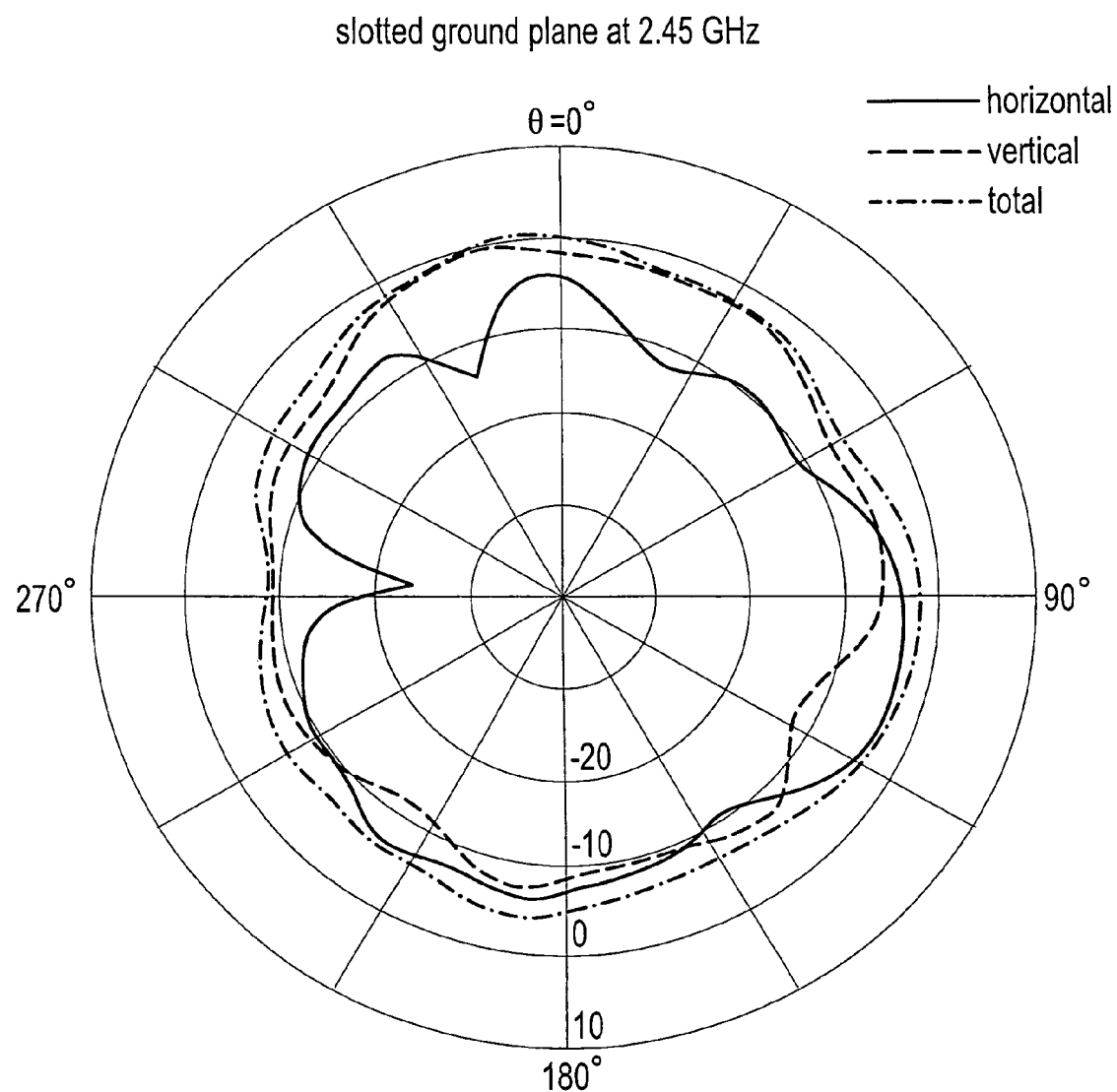
FIG. 11 graphically illustrates measured radiation patterns of the prototype low-profile antenna having the framework of FIGS. 3A~3B.

FIG. 11 graphically illustrates the measured radiation patterns at 2.45 GHz when the laptop display was opened at 90 degrees with respect to the base unit. In particular, FIG. 11 illustrates the radiation patterns for vertical and horizontal polarization and total fields in the horizontal plane. The radiation patterns indicate a close to omni-directional radiation pattern, which is conducive to mobile applications.

Moreover, TABLE 1 below illustrates the measured average and peak gain values at the different frequencies within the bandwidth for the prototype INF antenna.

TABLE 1

| | Measured gain | | |
|---|---|---|---|
| θ | 2.4 GHz | 2.45 GHz | 2.5 GHz |
| | Average gain, dBi | | |
| −20° | −1.8 | −1.7 | −2.5 |
| −10° | −4.7 | −4.0 | −3.5 |
| 0° | −3.7 | −3.5 | −3.5 |
| 10° | −4.1 | −3.9 | −3.9 |
| 20° | −2.2 | −2.0 | −2.2 |
| | Peak gain, dBi | | |
| −20° | 1.4 | 1.5 | 0.3 |
| −10° | −0.7 | 0.6 | 1.4 |
| 0° | 0.8 | 0.7 | 0.3 |
| 10° | 0.1 | −0.1 | −0.4 |
| 20° | 1.3 | 1.5 | 1.4 |

As is evident from TABLE 1, the gain values do not vary much across the band. Indeed, the average and peak gains are higher than −4 dBi and 0 dBi within a range of −20°<θ<20° elevation angles. Note that θ=0° is on the horizontal plane, and a negative angle is for above the horizontal plane.

FIGS. 5A–5I are schematic diagrams that illustrate different slot pattern that can be formed in a ground element of an antenna, according to exemplary embodiments of the invention. The exemplary patterns can be implemented with exemplary low-profile INF and UWB antennas described herein, for example. Essentially, the slot pattern of the ground plane can be varied to change the current distribution on the ground plane for reducing the size of the antenna with high radiation efficiency. The different slot/notch patterns can be selected to modify the direction of the image currents in the slotted regions of the ground plane to cancel or minimize such image current components and further increase the antenna radiation, as is understood by those of ordinary skill in the art.

Figure 6:
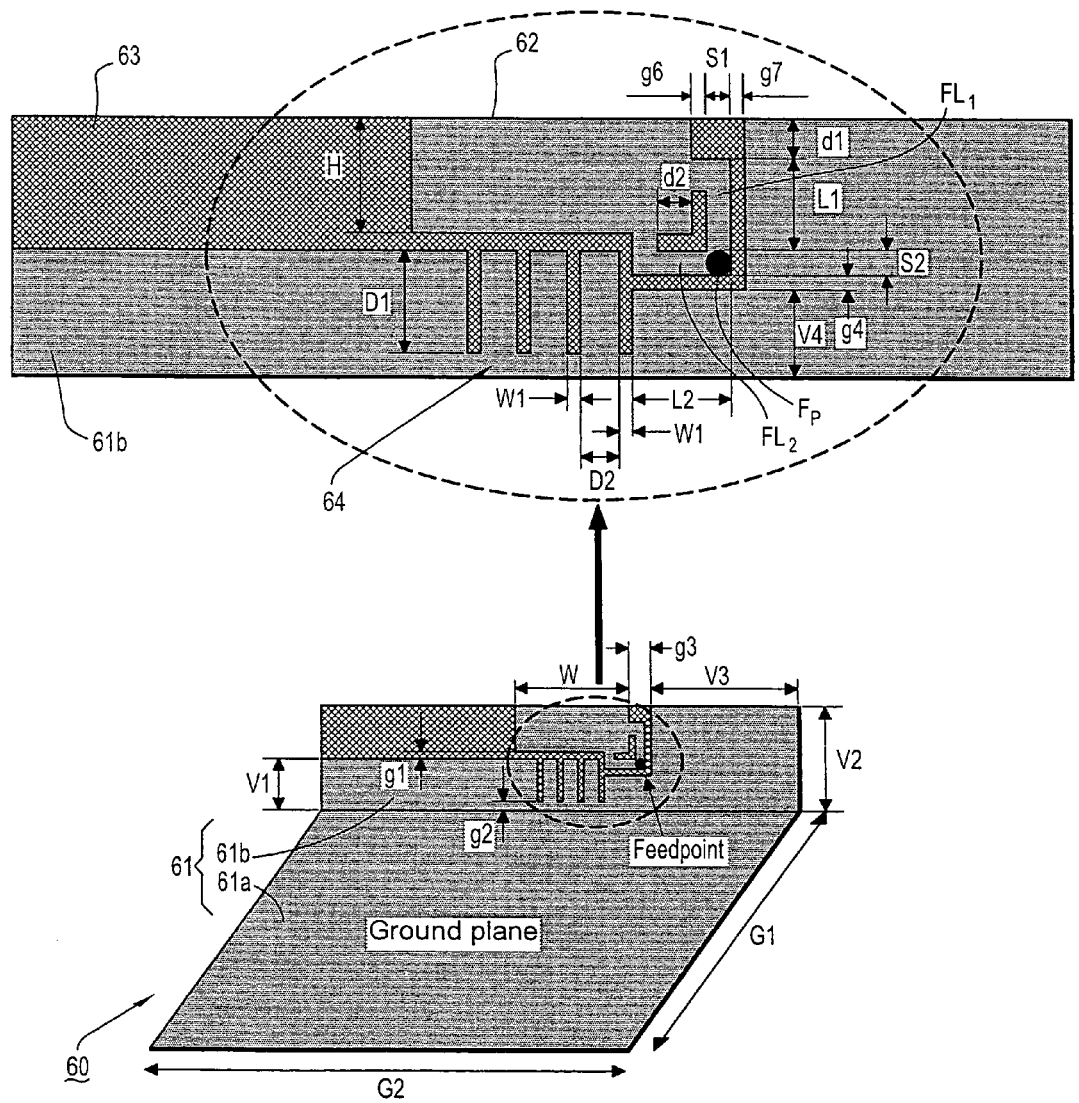
FIG. 6 is a schematic diagram illustrating a low-profile antenna according to another exemplary embodiment of the invention.

FIG. 6 is a perspective schematic view of a low-profile antenna according to another exemplary embodiment of the invention. More specifically, FIG. 6 schematically illustrates a low-profile UWB (ultra-wide band) antenna (60) according to an exemplary embodiment of the invention, which is designed having a slotted ground plane and double-feed scheme to enable reduction in the antenna height and achieve broadband impedance matching. In general, the exemplary UWB antenna (60) comprises a ground element (61) (or ground), a radiating element (62) (or radiator) and first and second feed lines (FL1) and (FL2). The ground element (61) comprises a first (horizontal) ground element (61a) and a second (vertical) ground element (61b). The radiator (62), feed lines (FL1) and (FL2) and second (vertical) ground element (61b) are patterned, printed, or otherwise formed, on one side of a substrate (63), and such elements are formed using a high conductivity metal sheet.

In the exemplary embodiment of FIG. 6, the radiator (62) is rectangular-shaped with dimensions of H×W (although other shapes may be implemented as depicted, for example in FIG. 9). The vertical ground element (61b) comprises a first region of height V1, which has an edge portion disposed adjacent to a bottom, horizontal edge of the radiator (62) and separated by a gap (g1). The vertical ground element (61b) comprises a comprises a second region of dimensions V2×V3, which has an edge portion disposed adjacent to a side, vertical edge of the radiator (62) and separated by a gap (g3).

The feed lines (FL1) and (FL2) have dimensions of L1×S1 and L2×S2, respectively. The feed lines (FL1) and (FL2) are substantially orthogonal to each other and are commonly connected at a feed point (FP). The feed line (FL1) is disposed vertically in the gap (g3) between a side edge of the radiator (62) and the vertical ground element (61b), and the feed line (FL1) is separated from the radiator (62) by a gap (g6) and separated from the vertical ground element (61b) by a gap (g7). The feed line (FL2) is disposed horizontally in a gap between the vertical ground element (61b) and a bottom edge portion of the radiator (62), and the feed line (FL2) is separated from an edge portion of vertical ground element (61b) by a gap (g4). The edge portion of the vertical ground element adjacent the feed line (FL2) extends to a height (V4) above the horizontal ground element (61a). The feed line (FL1) connects to the radiator (62) at a distance (d1) from the top edge of the radiator (62) and the feed line (FL2) connects to the radiator at a distance (d2) from the side edge of the radiator (62).

The vertical ground element (61b) comprises a slotted region (64) comprising a plurality of open ended slots formed below the bottom edge of the radiator (62). In the exemplary embodiment of FIG. 6, four slots are shown with dimensions of (D1×W1) with uniform separation of distance (D2). The slotted region (64) enables a reduction in the height (H) while maintaining desirable antenna properties. The notches (64) cause the out-of-phase currents on the vertical ground element (61b) to be at a greater distance (g1+D1) away from the bottom edge of the radiator (62). As the distance (g1+D1) increases, the cancellation of the radiation from the currents decreases, which improves the radiation efficiency. The dimensions D1, D2, and W1 are preferably selected to ensure that minimal out-of-phase horizontal induced current exists in the grid region.

In the exemplary embodiment of FIG. 6, the various dimensions can be selected to obtain desired antenna properties. For instance, with respect to bandwidth of operation, a lower edge frequency ($F_L$) of the bandwidth of the antenna (60) is determined primarily by the dimension (W) of the radiator (62), and to some degree by the dimension (H) of the radiator (62). As either dimension (W) or (H) increase, the lower edge frequency ($F_L$) decreases. Due to the wide bottom of the rectangular planar radiator (62), a broadband impedance transformer is effectively created.

The antenna (60) can be fed using a coaxial cable, wherein a center conductor of a coaxial cable is connected to the common feed point (FP) of feed lines (FL1) and (FL2). The location of the feed point (FP) affects the impedance match. Moreover, the gaps g4, g6, and g7 affect the impedance, wherein smaller gap sizes provide increased impedance matching. The region of the vertical ground element (61b) with the dimensions V2×V3 significantly affects the impedance match, and such region is disposed close to the vertical edge of the radiator (62). The horizontal ground element (61a) of dimensions G1×G2 alleviates the effect of installation environment (e.g., metal cover and display) on the impedance matching, and should be electrically connected to the cover or/and LCD panel.

As noted above, the antenna height (H) for a given bandwidth of operation can be optimally reduced due to the formation of the slotted region (64) to provide a low-profile design for, e.g., laptop computer applications. Without the slotted ground plane, a reduction of the height (H) would result in increasing the lower edge frequency ($F_L$) (i.e., reducing the bandwidth). The width (W1) of the slots (64) is determined by the higher-edge frequency ($F_H$). For instance, the width (W1) of the slots should be much smaller than the higher edge operating wavelength within the bandwidth. The dimension (D1) significantly affects the radiation efficiency because the notches (64) change the current distribution on the vertical ground element (61b), which is out-of-phase against the currents on the radiator (62). Moreover, to prevent strong horizontal out-of-phase currents on the ground element (61b), the separation (D2) should be smaller than the operating wavelength of the higher-edge frequency ($F_H$).

Figure 7A:
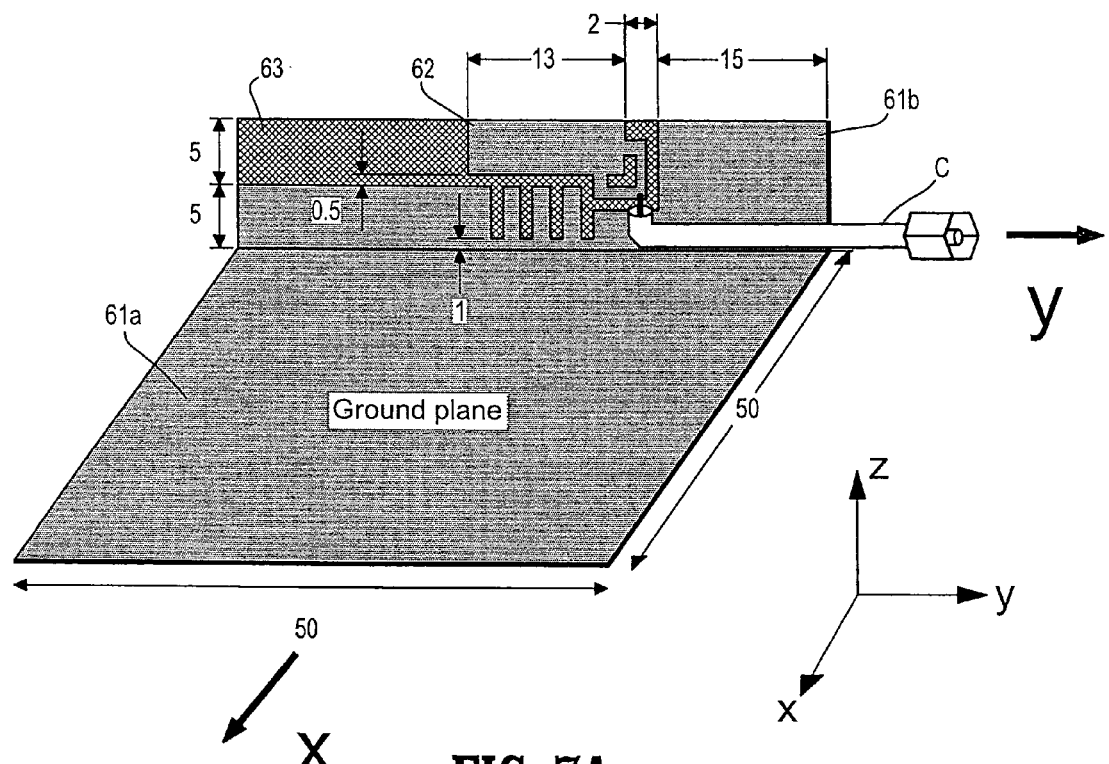
FIGS. 7A~7B schematically illustrate dimensions of a low-profile antenna having a framework similar to that of FIG. 6 for wide band operation from 3.1 GHz to 10.6 GHz, according to an exemplary embodiment of the invention.
Figure 7B:
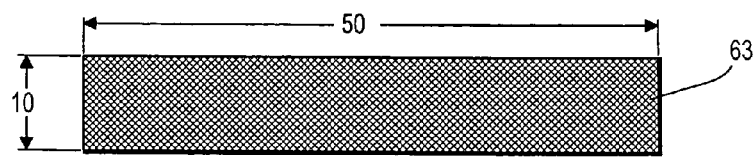

For purposes of testing and determining electrical properties and characteristics of an exemplary UWB antenna according to the invention, a prototype antenna was constructed using the antenna framework depicted in FIG. 6 for a laptop application. In particular, FIGS. 7A–7B illustrate specific dimensions (in mm) for the exemplary prototype UWB antenna having the antenna framework as depicted in FIG. 6 to provide a bandwidth of operation from 3.1 GHz to 10.6 GHz. FIG. 7A is a schematic perspective view of a front portion of the exemplary prototype antenna. The radiator (62) was fed by a coaxial cable (C), with the inner conductor of the coaxial cable connected to the feedpoint (FP) and the outer shield connected to the vertical and/or horizontal ground elements (although the orientation is not a concern). The radiator (62) and vertical ground element (61b) were formed on a thin dielectric PCB substrate (63). In particular, the antenna was etched onto a 10 mm×50 mm×20 mil 25N Arlon PCB substrate (63) with a dielectric constant of 3.38 and a loss tangent of 0.0025 at 10 GHz. FIG. 7B depicts a back view of the substrate (63) having dimensions of 10 mm×50 mm.

Figure 8:
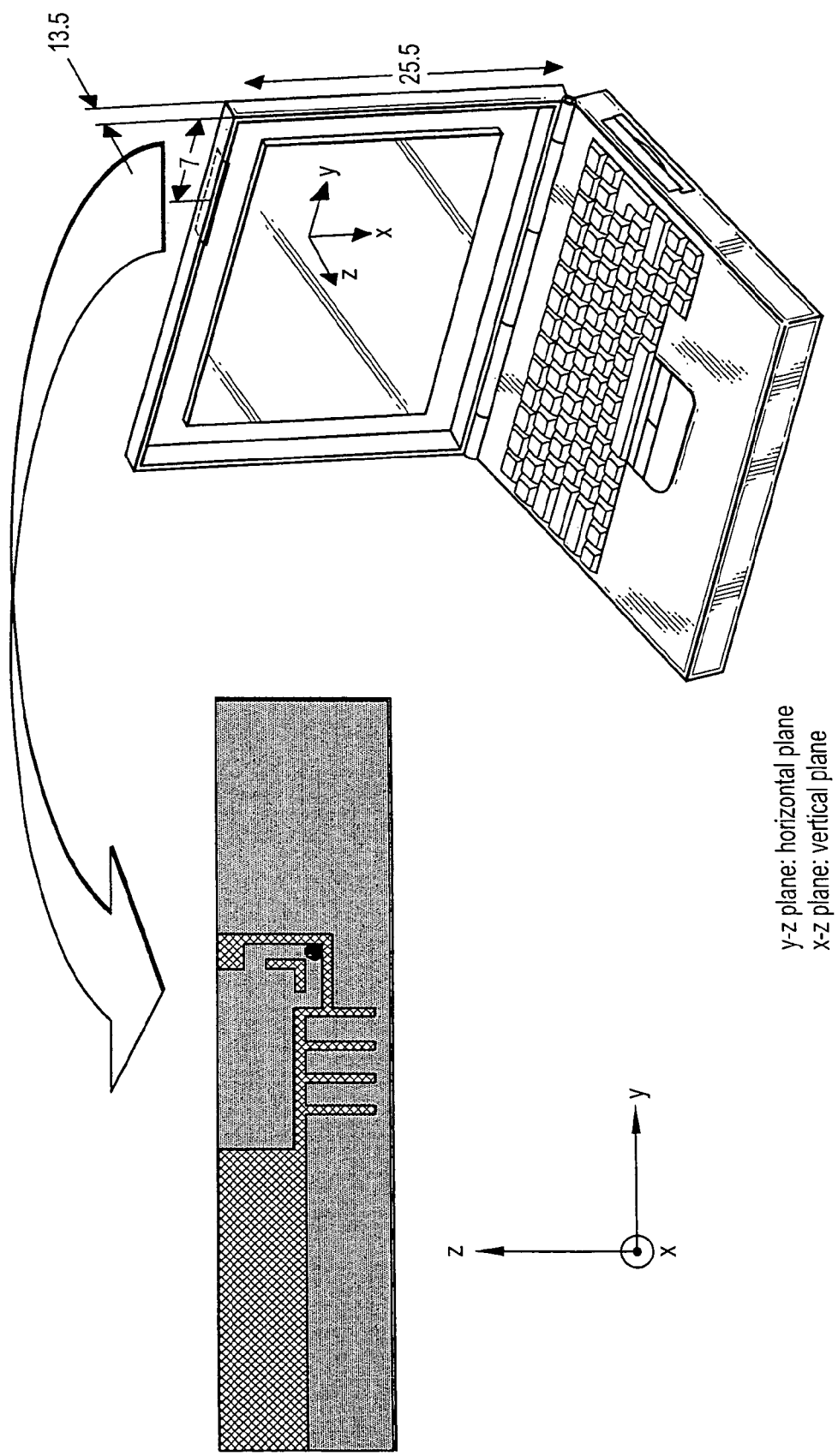
FIG. 8 schematically illustrates a prototype implementation of a low-profile UWB antenna implemented in a laptop computer, according to an exemplary embodiment of the invention.

The prototype UWB of FIGS. 7A–7B was installed in an IBM ThinkPad laptop computer having a metal composite cover, in the location and orientation such as depicted in FIG. 8. The substrate (63) having the radiator (62) and vertical ground element (61b) was disposed parallel to the ThinkPad frame cover sidewall (which has a height of 12 mm (inside) and a slant of $\sim10^o$) (e.g., the substrate (63) (y–z plane) was disposed substantially perpendicular to the plane of the display panel) with the radiator portion extending past the plane of the display panel. An RF feed cable of a length of 12 cm was installed along the frame of the display. The minimum distance between the frame of the display panel to the bottom of the antenna (bottom) was about 3 mm. The thickness of the display panel was about 5 mm. The top of the antenna was about 2 mm below the top of the cover sidewall.

Figure 12:
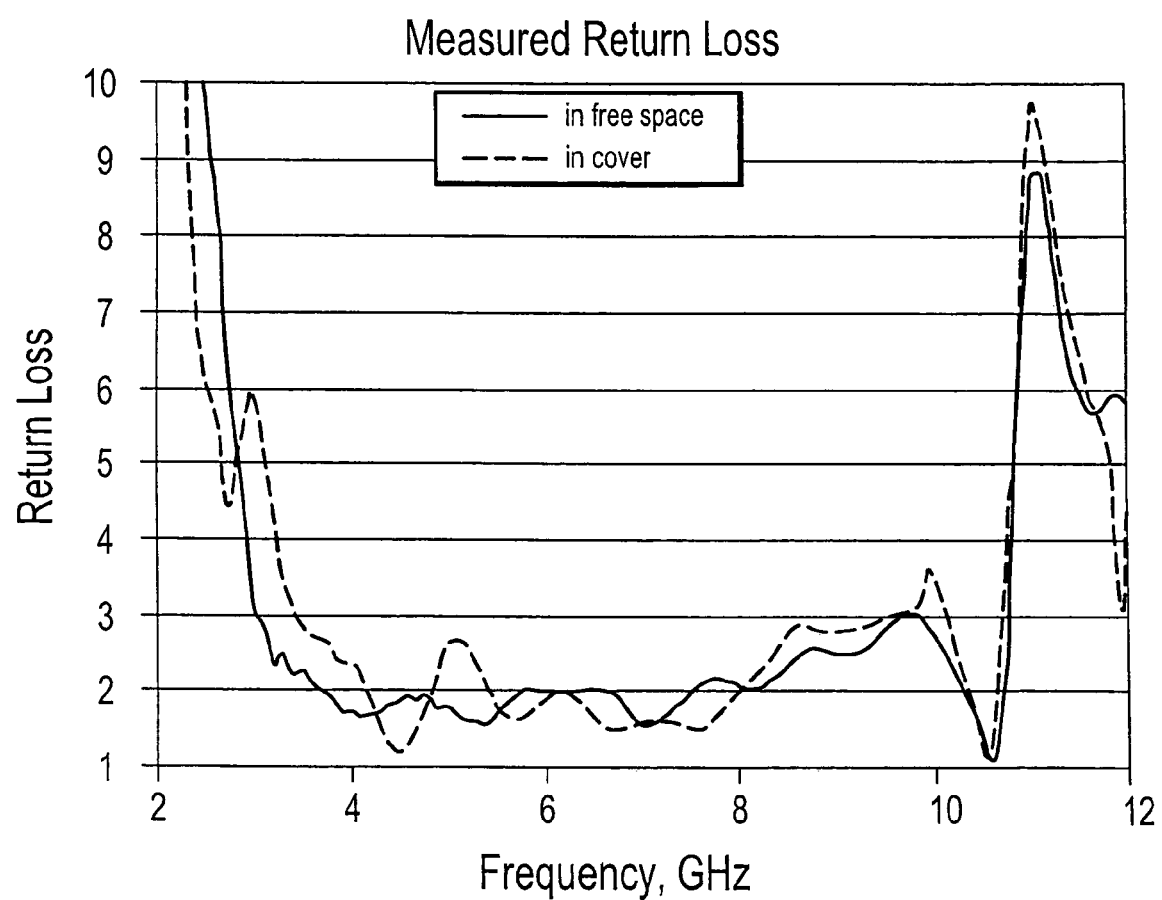
FIG. 12 graphically illustrates the measured SWR of the prototype low-profile antenna having the framework of FIGS. 7A~7B over a bandwidth of 2–12 GHz.

Standing wave ratio (SWR) and radiation measurements were performed with the prototype UWB antenna both in free space and mounted in the prototype laptop in an anechoic chamber. In particular, FIG. 12 compares the measured SWR of the prototype UWB antenna in free space and in the laptop display in the frequency band of 2 GHz–12 GHz. In free space, the prototype UWB antenna was found to provide sufficient 3:1 SWR bandwidth to cover the UWB band (3.1 GHz–10.6 GHz). Moreover, similar return loss measurements were obtained with respect to measurement of the UWB antenna mounted in the laptop, but with the installation environment affecting the impedance match at the lower edge frequencies to some degree to decrease the bandwidth, but still acceptable in the entire UWB band.

Figure 13:
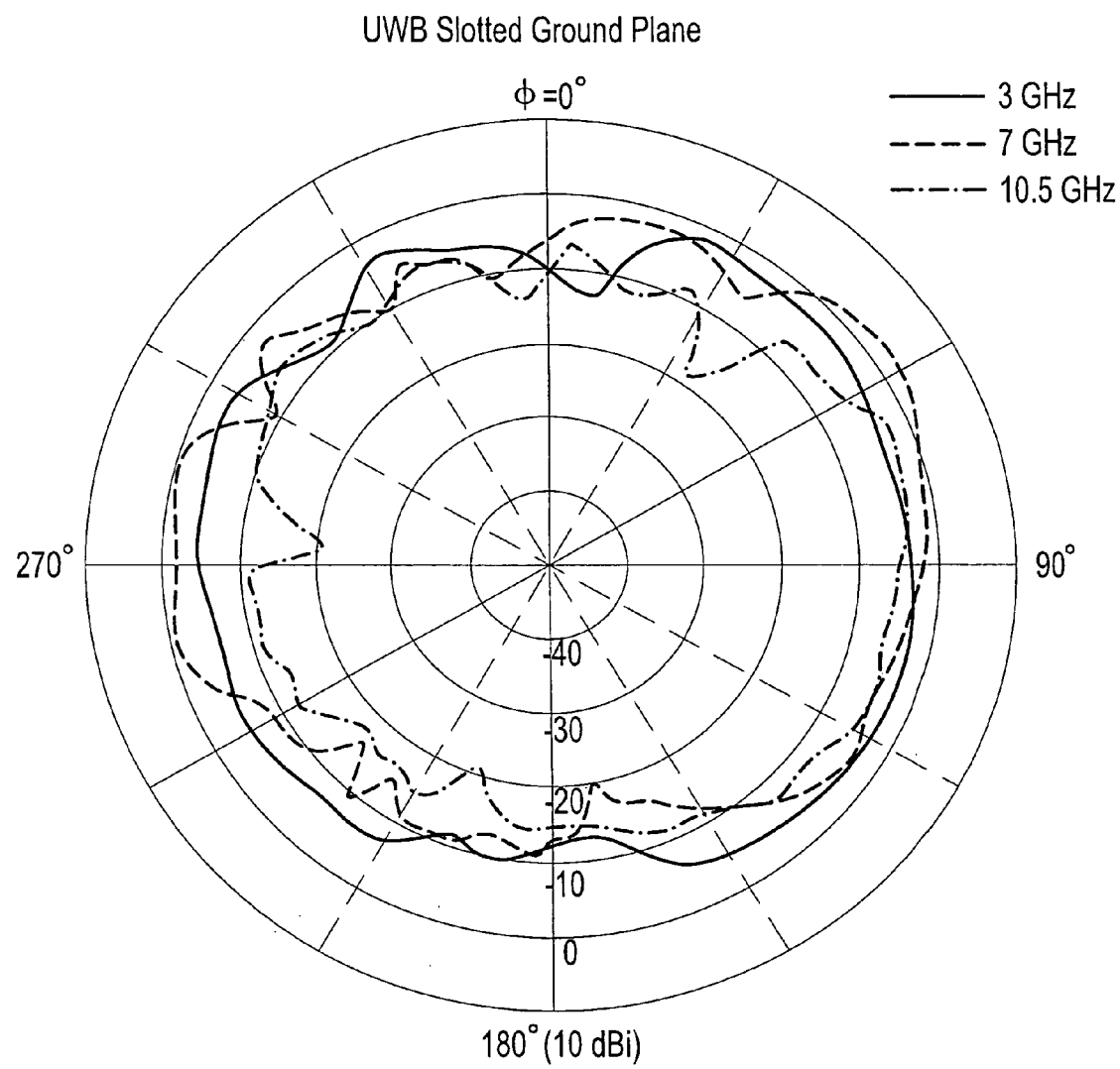
FIG. 13 graphically illustrates measured radiation patterns of the prototype low-profile antenna having the framework of FIGS. 7A~7B at frequencies of 3, 7 and 10.5 GHz.

Moreover, FIG. 13 illustrates the measured radiation patterns on the horizontal plane ((y–z) plane) of the prototype UWB antenna mounted in the laptop display at frequencies of 3.0 GHz, 7.0 GHz and 10.5 GHz (with the laptop display opened at 90 degrees with respect to the base unit). As depicted in FIG. 13, the radiation patterns are substantially similar, but slightly change to some extent across the bands, especially at higher frequencies, at which the display blocks the radiation.

FIGS. 14A and 14B are tables that list the measured average gain and maximum (peak) gains for the exemplary prototype UWB antenna as installed in the laptop computer at different frequencies from 3–10.5 GHz. The exemplary UWB antenna provides good electrical characteristics (e.g., acceptable gain, omni-directional azimuth plane radiation patterns within elevation angles of +/−30 degrees). Moreover, a single feed point implementation enables the UWB antenna to be readily integrated within small space available in the most laptop computers, etc. Moreover, the exemplary UWB design sufficiently covers other WLAN bands of 5.15 GHz~5.35 GHz and 5.47 GHz~5.825 GHz.

It is to be appreciated that other low-profile UWB antenna designs may be implemented, and that the exemplary UWB antenna of FIG. 6 is merely one illustrative embodiment. For instance, FIGS. 9A~9H illustrates UWB antennas according to exemplary embodiments of the invention, wherein the radiators (R) and coplanar ground elements (G) are designed with varying geometric dimensions and shapes to enable increased bandwidths of operation. For instance, the radiators (R) depicted in FIGS. 9A, 9C, 9D, 9F, 9G and 9H have smooth or tapered structures which tend to widen antenna bandwidth. Moreover, the vertical ground elements (G) depicted in FIGS. 9A and 9B, for example, have tapered edges which can be adjusted to improve antenna bandwidth.

Figure 9A:
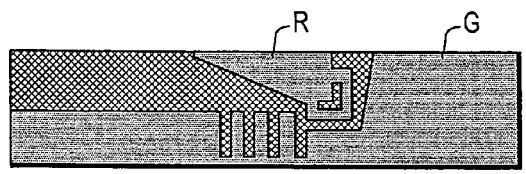
FIG. 9 illustrates low-profile UWB antennas according to other exemplary embodiments of the invention.
Figure 9E:
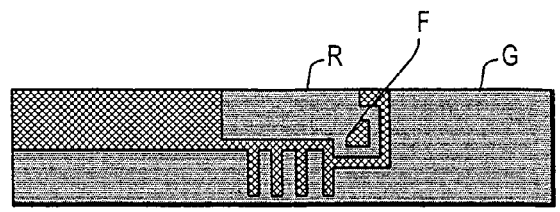
Figure 9B:
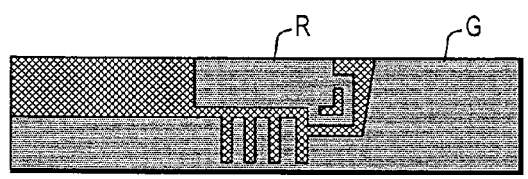
Figure 9F:
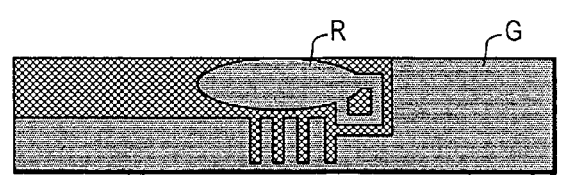
Figure 9C:
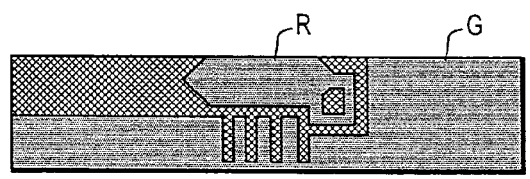
Figure 9G:
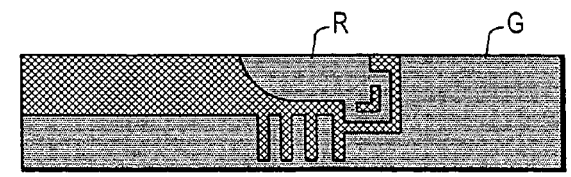
Figure 9D:
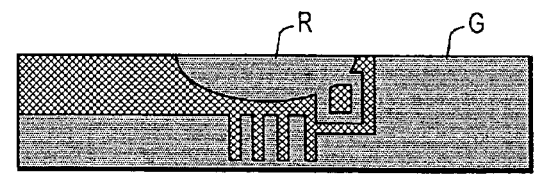
Figure 9H:
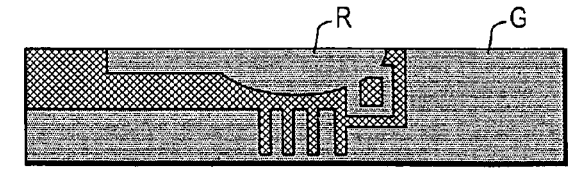

Moreover, with the exemplary antenna of FIG. 9E, the corner of the radiator (R) is tapered near the feed line connections points to the radiator, which can also be adjusted to improve antenna bandwidth.

Although illustrative embodiments have been described herein with reference to the accompanying drawings, it is to be understood that the present invention is not limited to those precise embodiments, and that various other changes and modifications may be affected therein by one skilled in the art without departing from the scope of the invention.

What is claimed is:

1. An antenna, comprising:
    a planar radiating element; and
    a ground element comprising a planar ground element that is coplanar with the planar radiating element;
    wherein the planar radiating element comprises a first edge that is spaced apart and disposed adjacent to a first edge of the planar ground element,
    wherein the planar ground element comprises a slotted region formed along a portion of the first edge of the planar ground element, wherein the slotted region comprises a plurality of slots that are disposed in proximity to, and aligned with, an overlapping portion of the first edge of the planar radiator element, and wherein the plurality of slots are disposed at a distance away from a feed point an the planar radiating element.

2. The antenna of claim 1, wherein the slotted region is patterned to minimize the effects of out-of-phase currents induced by the radiating element on the ground element adjacent to the radiating element.

3. The antenna of claim 1, wherein the planar radiating element and planar ground element are patterned on one side of a planar substrate.

4. The antenna of claim 1, wherein the first edge of the planar radiating element and the first edge of the planar ground element are substantially parallel.

5. The antenna of claim 1, wherein the slotted region formed along the first edge of the coplanar ground element comprises open-ended slots.

6. The antenna of claim 5, wherein the open-ended slots comprise meandering slots.

7. The antenna of claim 5, wherein the open-ended slots comprise tapered slats.

8. The antenna of claim 5, wherein the open-ended slots are substantially parallel and evenly spaced.

9. The antenna of claim 1, wherein the planar radiating element comprises one or more planar signal feed lines connected thereto.

10. The antenna of claim 9, wherein the one or more planar signal feed lines are coplanar to the planar radiating element.

11. The antenna of claim 1, wherein the planar radiating element comprises a second edge that is spaced apart and adjacent to a second edge of the planar ground element.

12. The antenna of claim 11, wherein the first and second edges of the planar ground element are substantially perpendicular.

13. The antenna of claim 11, wherein the first and second edges of the planar radiating element are substantially perpendicular.

14. The antenna of claim 1, wherein at least a portion of the first edge of the planar radiating element is parallel to the first edge of the planar ground element.

15. The antenna of claim 1, wherein at least a portion of the first edge of the planar radiating element is curved.

16. The antenna of claim 1, wherein at least a portion of the first edge of the planar radiating element is angled with respect to the first edge of the planar ground element.

17. The antenna of claim 1, wherein the antenna is an inverted-F type antenna.

18. The antenna of claim 1, wherein the antenna is an ultra wide band antenna.

19. The antenna of claim 1, wherein the ground element further comprises a second planar ground element that subtends an angle with respect to the planar ground element.

20. A computing device, comprising:
a display unit comprising a flat panel display and a cover that houses the flat panel display; and
an antenna embedded within the display unit, the antenna comprising:
a planar radiating element; and
a ground element comprising a planar ground element that is coplanar with the plan radiating element;
wherein the planar radiating element comprises a first edge that is spaced apart and disposed adjacent to a first edge of the planar ground element,
wherein the planar ground element comprises a slotted region formed along a portion of the first edge of the planar ground element, wherein the slotted region comprises a plurality of slots that are disposed in proximity to, and aligned with, an oven overlapping portion of the first edge of the planar radiator element, and wherein the plurality of slots are disposed at a distance ay from a feed point on the planar radiating element.

21. The computing device of claim 20, wherein the antenna is disposed between a sidewall o the flat panel display and a sidewall of the display cover such that the planar radiator element is disposed above a surface of the flat panel display.

22. The computing device of claim 21, further comprising a coaxial cable connected to the antenna for feeding the antenna.

23. The computing device of claim 20, wherein the antenna comprises a planar substrate, wherein the planar radiating element and planar ground element are patterned on one side of the planar substrate.

24. The computing device of claim 20, wherein the ground element further comprises a second planar ground element that subtends an angle with respect to the planar ground element.

25. The computing device of claim 20, wherein the antenna is an INF (inverted-F) type antenna, wherein the planar radiating element comprises an inverted-F element, wherein the inverted-F element comprises:
a planar radiating arm that extends along a portion of the first edge of the planar ground element;
a planar shorting element that connects one end of the planar radiating arm to the planar ground element; and
a feed tab connected to the radiating arm and spaced apart from the shorting element at a feed point of the antenna.

26. The computing device of claim 25, wherein the INF antenna is designed to operate in the 2.45 GHz ISM band, and wherein a height of the radiating element is about 2.5 mm above the first edge of the planar ground element.

27. The computing device of claim 25, wherein the slotted region of the planar ground element is disposed adjacent to a portion of the planar radiating arm between the feed tab and a non-grounded end of the planar radiating arm.

28. The computing device of claim 27, wherein the slotted region comprises open-ended slots.

29. The computing device of claim 28, wherein the open-ended slots comprise meandering lots.

30. The computing device of claim 28, wherein the open-ended slots comprise tapered slot.

31. The computing device of claim 28, wherein the open-ended slots are substantially parallel and evenly spaced.

32. The computing device of claim 25, further comprising a coaxial line wherein an inner conductor of the coaxial line is connected to the feed tab and wherein an outer ground shield of the coaxial line is connected to the planar ground element.

33. The computing device of claim 20, wherein the antenna is an UWB (ultra-wideband) antenna.

34. The computing device of claim 33, wherein the UWB antenna is designed to provide a wide impedance bandwidth of about 3.1 GHz to about 10.6 GHz, and wherein a height of the radiating element is about 6 mm or less above the first edge of the planar ground element.

35. The computing device of claim 33, wherein the planar radiating element comprises a planar monopole element, wherein the planar ground element comprises a second edge that is substantially perpendicular to the first edge of the planar ground element, and wherein the planar monopole element is spaced apart and adjacent to the second edge of the planar ground element.

36. The computing device of claim 35, wherein the planar monopole element is rectangular shaped.

37. The computing device of claim 35, wherein the planar monopole element is elliptical shaped.

38. The computing device of claim 35, wherein the UWB antenna further comprises two feed lines, wherein the feed lines each have a first end that are connected to the planar monopole radiating element at different points thereof, and a second end that are commonly connected.

39. The computing device of claim 38, further comprising a coaxial line wherein an inner conductor of the coaxial line is connected to the commonly connected second ends of the two feed lines and wherein an outer ground shield of the coaxial line is connected to the planar ground element.

40. The computing device of claim 38, wherein the planar ground element further comprises a third edge that is substantially parallel to the first edge of the planar ground element but spaced apart from the planar monopole radiating element at a greater distance than said first edge of the planar ground element, wherein the third edge intersects the second edge of the planar ground element, and wherein one feed line is disposed in a gap between the second edge of the planar ground element and the planar monopole radiating element, and wherein another feed line is disposed in a gag between the third edge of the planar ground element and the planar monopole element.

* * * * *